O. LUDEKENS.
SOAP AND PROCESS OF MAKING THE SAME.
APPLICATION FILED JULY 23, 1917.

1,276,383.

Patented Aug. 20, 1918.

INVENTOR
O. LUDEKENS

BY *J. M. Wright*

ATT'Y.

UNITED STATES PATENT OFFICE.

OONA LUDEKENS, OF SAN FRANCISCO, CALIFORNIA, ASSIGNOR TO THE WITE-KAT SOAP COMPANY, OF SAN FRANCISCO, CALIFORNIA, A CORPORATION OF CALIFORNIA.

SOAP AND PROCESS OF MAKING THE SAME.

1,276,383.  Specification of Letters Patent.  Patented Aug. 20, 1918.

Application filed July 23, 1917. Serial No. 182,194.

*To all whom it may concern:*

Be it known that I, OONA LUDEKENS, a citizen of the United States, residing at San Francisco, in the county of San Francisco and State of California, have invented new and useful Improvements in Soap and Processes of Making the Same, of which the following is a specification.

The object of the present invention is to provide a soap which can be used without water, and which is therefore very useful to persons employed in a variety of occupations, such as actors, chauffeurs, printers, machinists, and mechanics generally, railroad and street car men, boot blacks, cobblers, and creosote workers.

To make the soap, to two quarts of water heated to a temperature of 200° F. is added one pound of neutral soap chips containing a moisture content of 12%. The temperature of this mixture is then raised to boiling point and maintained thereat until the soap chips are thoroughly dissolved. The temperature of the mixture is then reduced to 160° F. To the mixture is then added one quart of boiling water containing dissolved therein, 6 ounces of carbonate of soda. The temperature of the mixture is then increased to 260° F. and is maintained at this degree for 15 minutes, when there is added 1½ ounces of parawax. Still maintaining the mixture at the same temperature for 10 minutes, there is then added one ounce of refined beeswax. After 10 minutes, during which the mixture is maintained at the same temperature, there are added 3 quarts of water at a temperature of 40°. The mass is then allowed to cool to 90° F.

It is then agitated and also aerated, but not excessively, for an excessive aeration would result in the mixture containing numerous large and weak air bubbles which would collapse immediately before or upon use.

Figure 2:
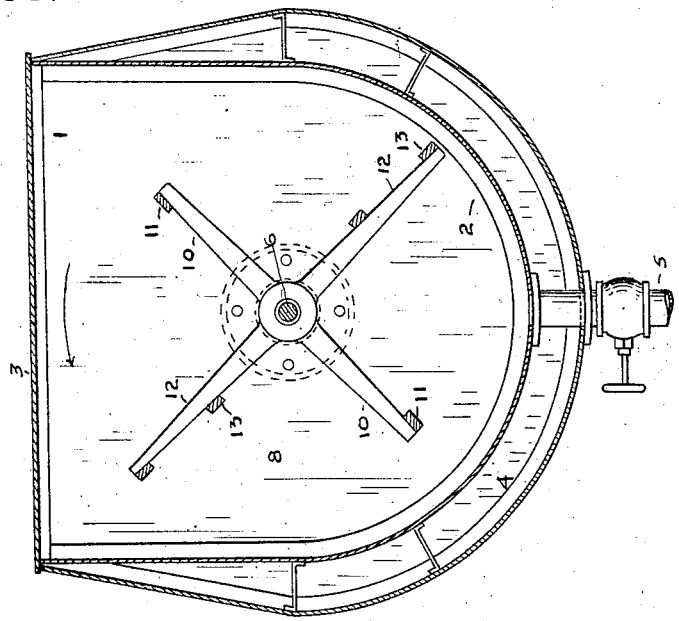
Figure 1:
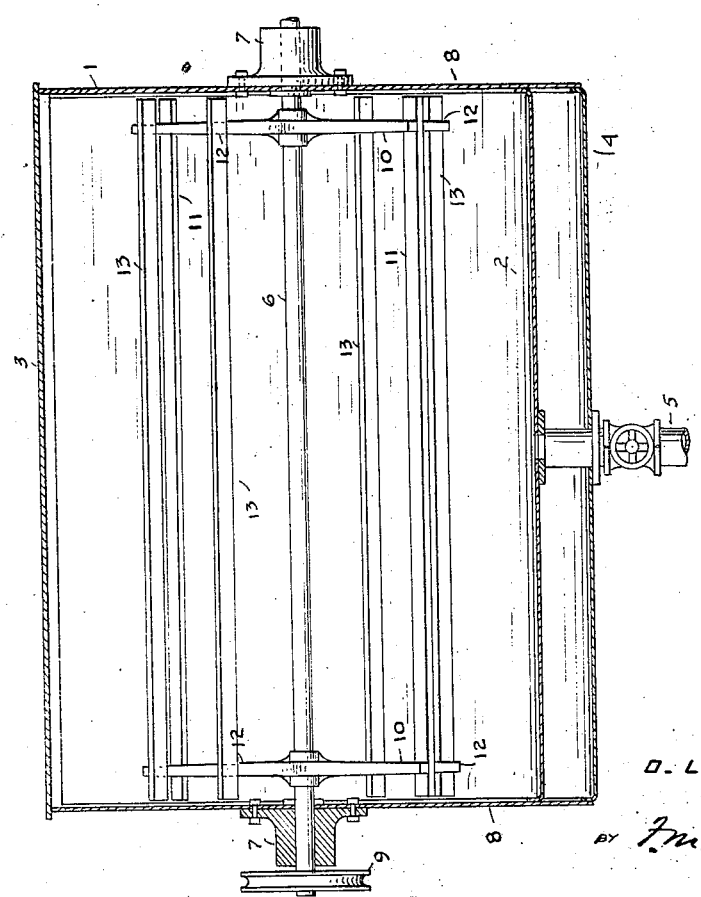

In the accompanying drawing, Figure 1 is a longitudinal section, and Fig. 2 is a cross-section, of a vessel which I have found suitable for sufficiently agitating and aerating the mixture.

Referring to the drawing, 1 indicates a vessel having a round bottom 2 and a closed top 3. It is surrounded by a water jacket 4 and is drained by a pipe 5. Extending longitudinally through said vessel is a shaft 6 extending through bearings 7 on the ends 8 of the vessel and rotated by a grooved pulley 9. From said shaft extend diametrically opposite to each other pairs of beaters 10 each pair connected by a single blade 11, and also diametrically opposite to each other and at right angles to the beaters 10, pairs of beaters 12, each pair having two blades 13 connecting them at distances from the axis of the mixer respectively greater and less than the blades 11. This mixture should be rotated for fifteen minutes at a speed of twenty-seven revolutions a minute.

In use a small quantity of the soap is rubbed on the part to be cleansed until the lather and dirt are thoroughly mixed, and they are then removed by a piece of paper, waste, or saw dust. If the hands are very dirty, first remove the first mixture and then use a little more of the soap.

It is believed that the agitation of the mixture of water and soap dissolved therein with parawax and beeswax at a high temperature has the effect of causing the parawax and beeswax to form minute envelops or capsules inclosing the liquid soap, which capsules are broken and the liquid soap is released when the soap is used.

I claim:

1. The process of making soap which consists in adding to hot water having soap dissolved therein parawax or beeswax substantially in the proportion specified, and then, after allowing the mixture to cool to normal temperature, agitating and aerating the same.

2. The process of making soap, which consists in mixing a hot, soapy liquid with parawax substantially in the proportion specified, and then agitating and aerating the same to reduce it to a paste like form.

3. The process of making soap, which consists in mixing a hot, soapy liquid with a substance capable of forming minute comparatively durable envelops inclosing the liquid, and then agitating the mixture to reduce it to a paste like form.

4. The process of making soap, which consists in mixing a hot, soapy liquid with a waxy substance, and then agitating and aerating the mixture to reduce it to a paste like form.

OONA LUDEKENS.